Aug. 17, 1965  E. G. SWETT  3,200,791
COPYHOLDER
Filed Dec. 17, 1962  7 Sheets-Sheet 3
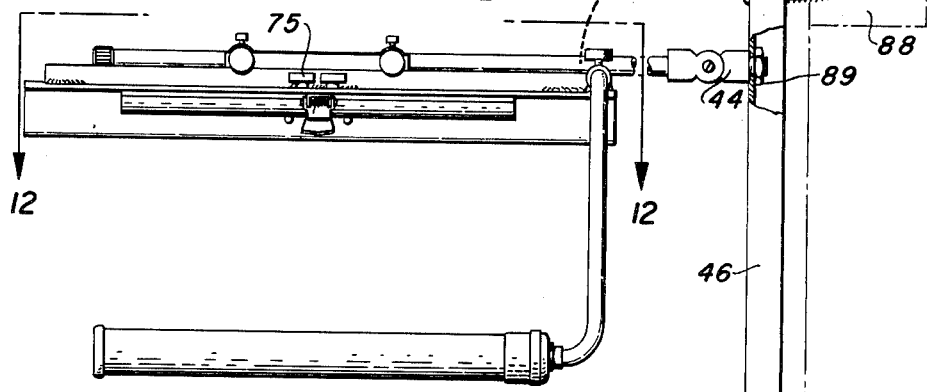
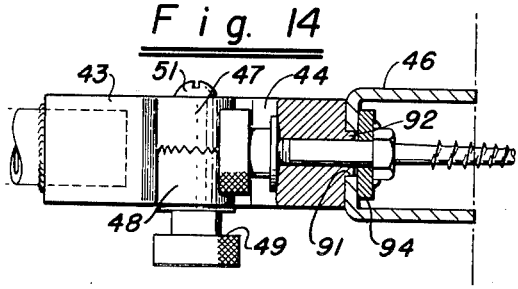
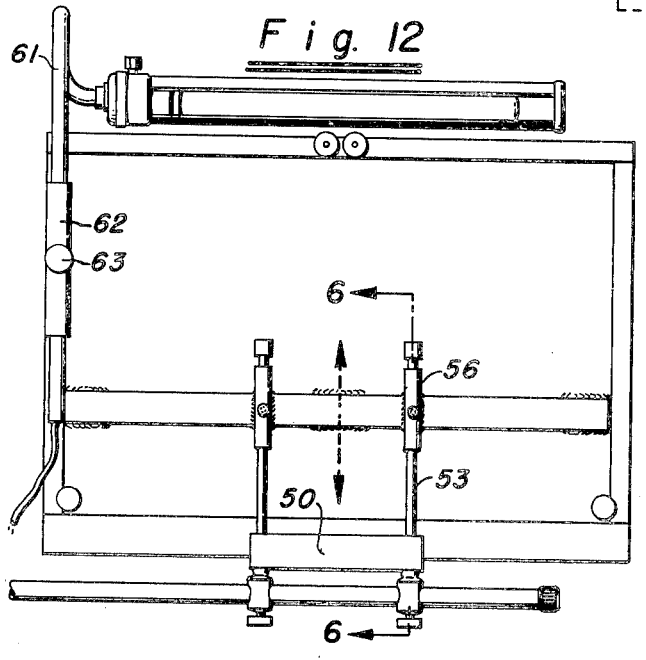
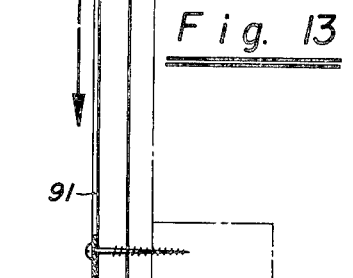
INVENTOR.
*Erwin G. Swett*
BY *Fryer & Tjensvold*
Attorneys

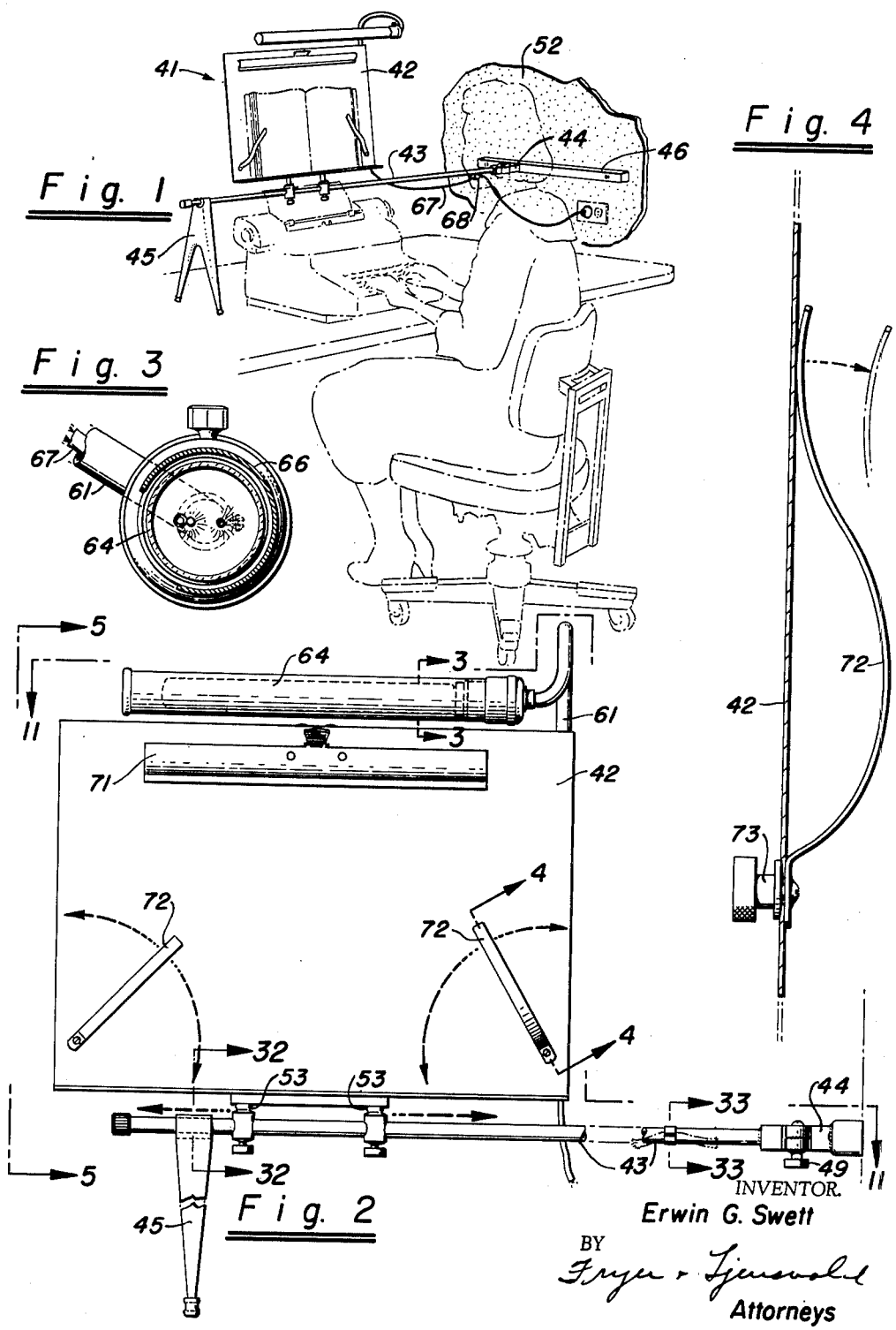

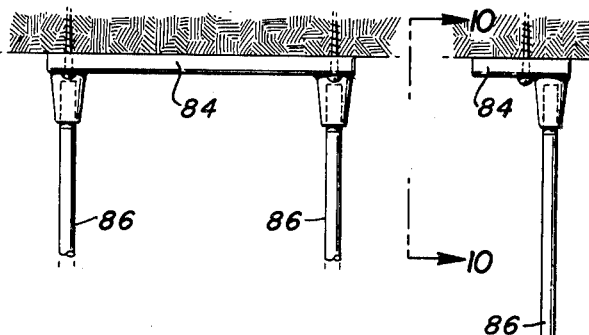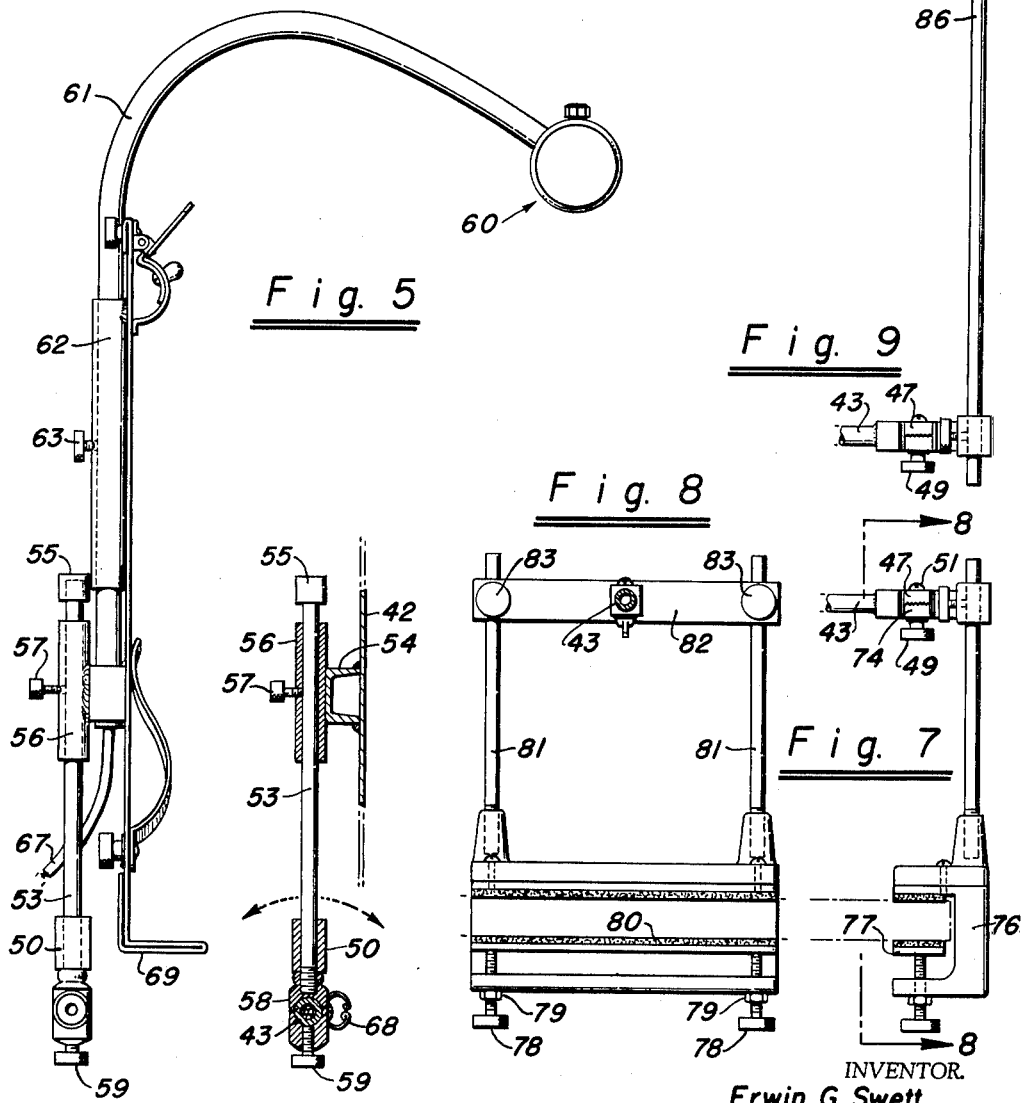

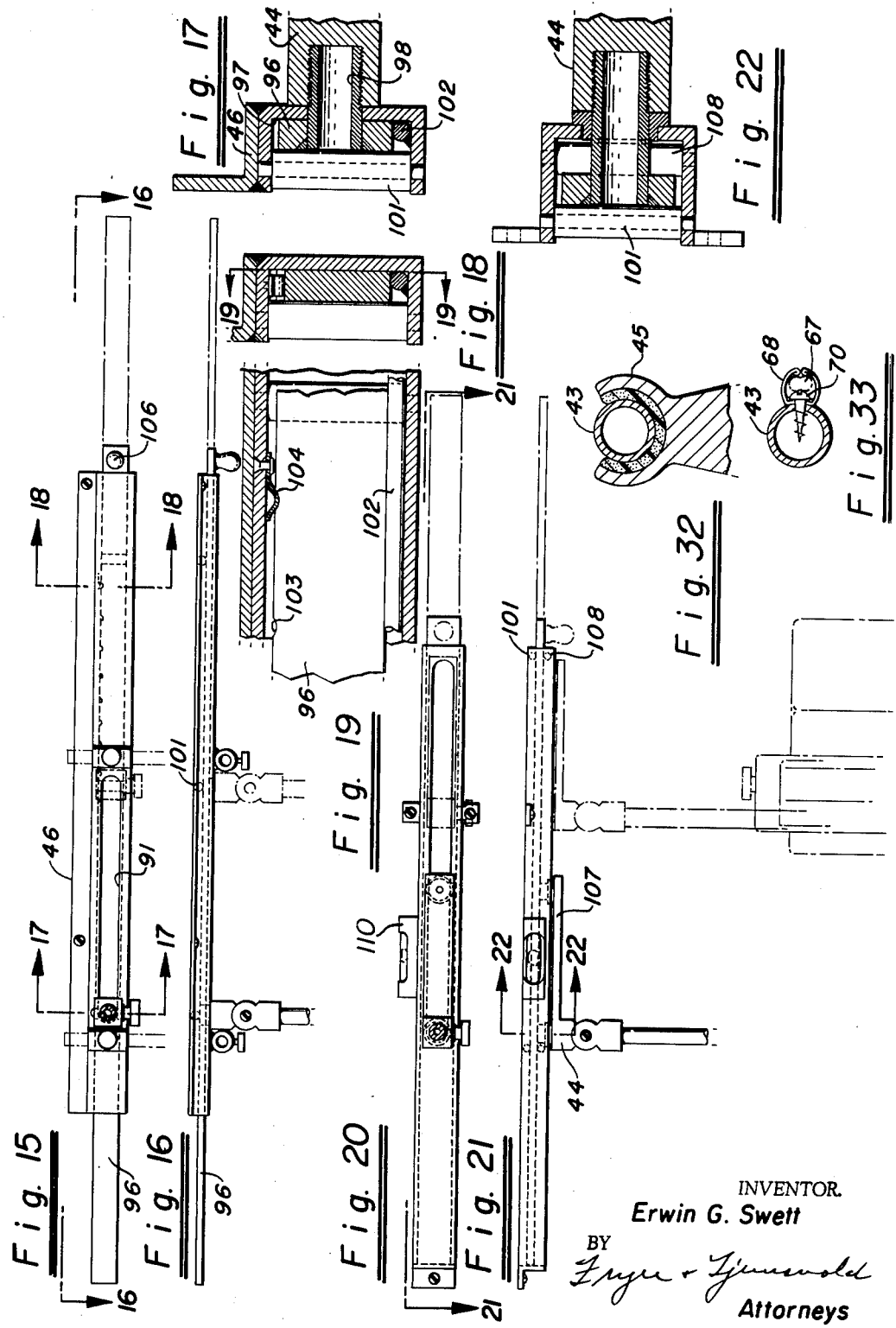

Aug. 17, 1965  E. G. SWETT  3,200,791
COPYHOLDER
Filed Dec. 17, 1962  7 Sheets-Sheet 5
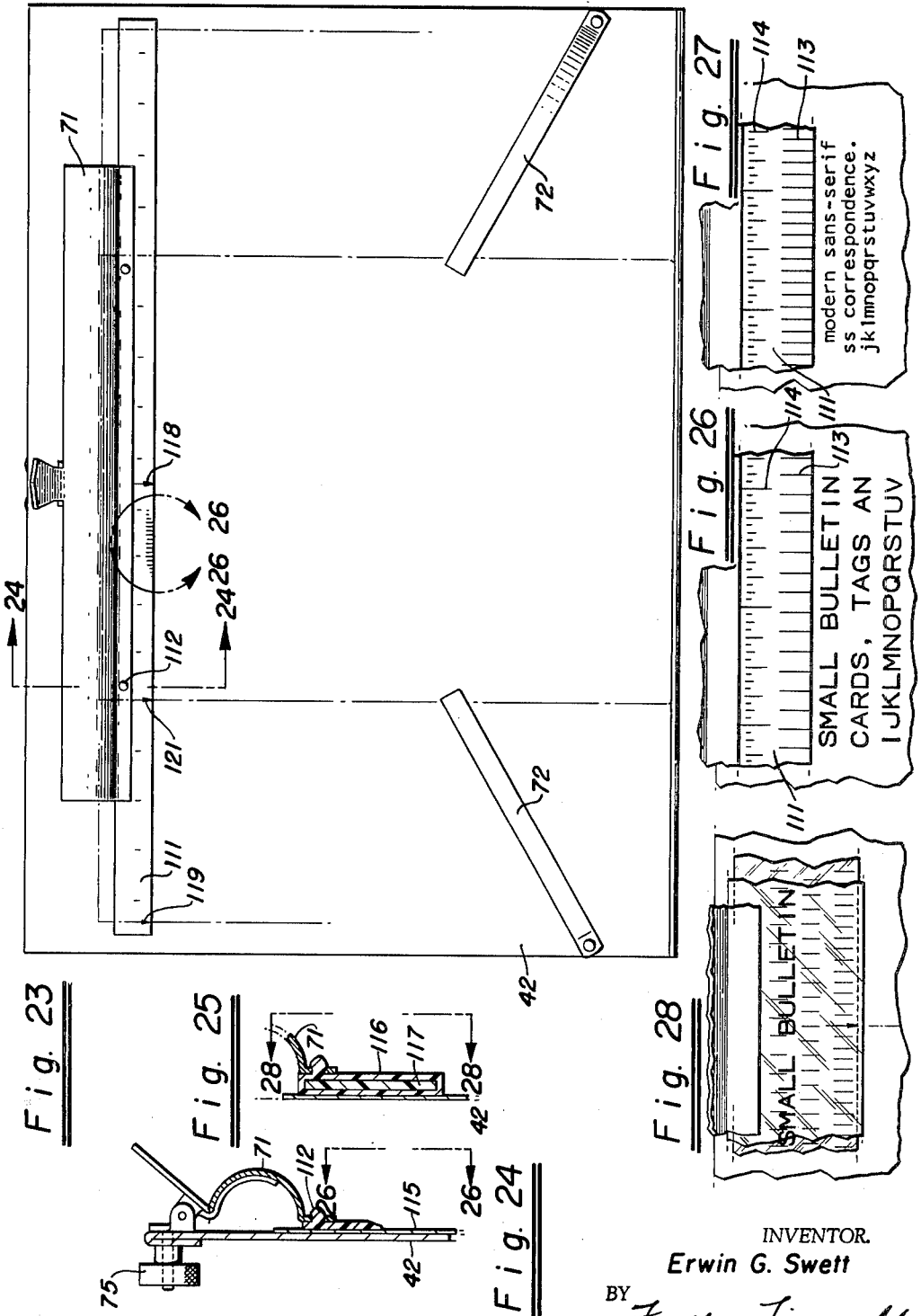
INVENTOR.
Erwin G. Swett
BY
Fryer + Tjensvold
Attorneys

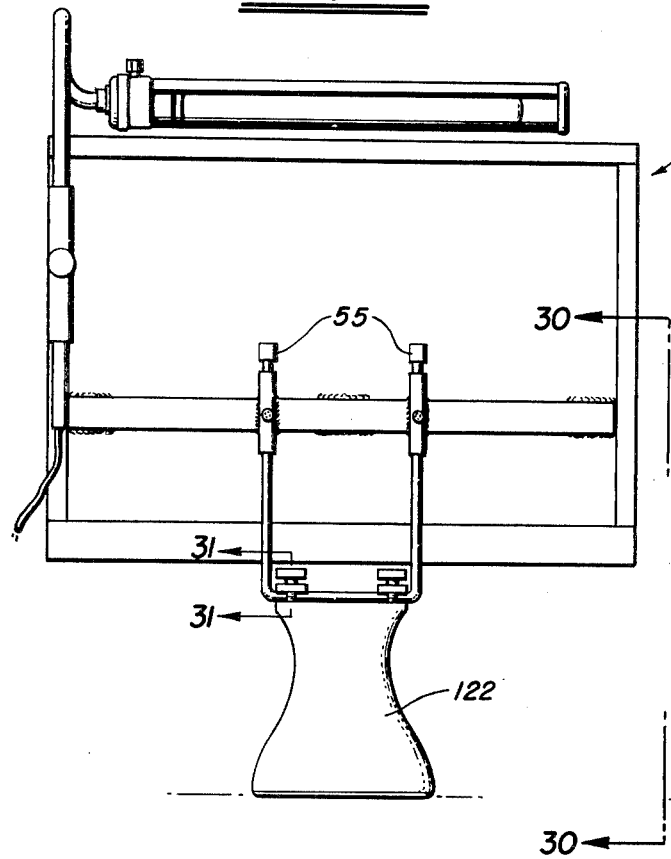
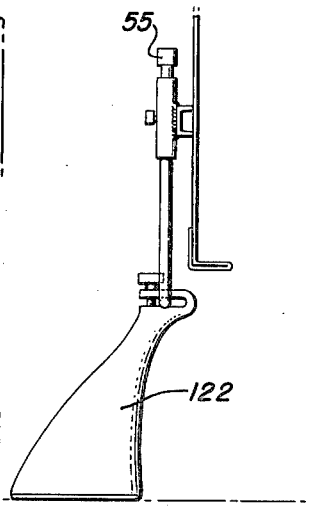
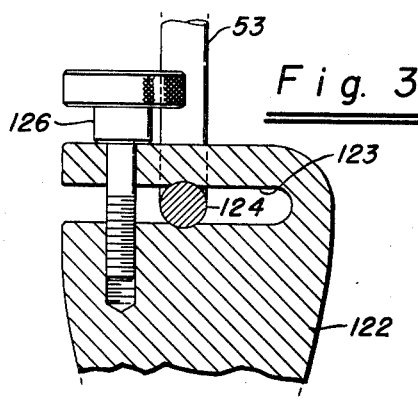

Aug. 17, 1965  E. G. SWETT  3,200,791
COPYHOLDER

Filed Dec. 17, 1962  7 Sheets-Sheet 7

INVENTOR.
Erwin G. Swett
BY
Fryer + Tjensvold
Attorneys

United States Patent Office 3,200,791
Patented Aug. 17, 1965

3,200,791
COPYHOLDER
Erwin G. Swett, 737 Webster St., San Francisco 17, Calif.
Filed Dec. 17, 1962, Ser. No. 245,046
3 Claims. (Cl. 120—28)

This invention relates to a copyholder for positioning and retaining papers, books and other written material in a desired location and at a desired angle. The copyholder of the present invention is particularly well suited for use in offices to hold copy to be transcribed.

The copyholder of the present invention includes a board for supporting the material to be viewed. The board is large enough to easily accommodate large size sheets, books or the like and includes top and side clamps which can be positioned to retain smaller size material securely in place on the board. The board is wide enough to accept two sheets of legal size paper side-by-side and yet is equally effective to hold small note size paper if desired. A top clip extends along the greater portion of the width of the board to minimize turn-up of the corners of the material on the board. A pair of side clips are removably mounted on the lower part of the board and are each rotatable about one end to facilitate clamping of materials of different widths. A character count and line centering transparent member is carried by the upper clip so as to be directly superimposed in register with the characters of the written copy on the board to permit faster and easier transcription of the written copy.

In one form of the present invention the board is mounted on a swing arm which is rotatable in a horizontal plane about one end to permit the board to be readily swung out of the way when not in use. One or more tilt arms are axially movable along and rotatable about the swing arm so that the horizontal and vertical position and angle of the board and material carried thereon can be easily adjusted. A copyholder incorporating the features described constitutes an object of the present invention.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is an isometric view, with a typist shown in phantom outline, of a copyholder constructed in accordance with one embodiment of the present invention;

FIG. 2 is a front elevation view of the copyholder shown in FIG. 1;

FIG. 3 is a cross section view taken along the line and in the direction indicated by the arrows 3–3 in FIG. 2;

FIG. 4 is a fragmentary enlarged view of a side clip taken along the line and in the direction indicated by the arrows 4–4 in FIG. 2;

FIG. 5 is a side elevation view taken along the line and in the direction indicated by the arrows 5–5 in FIG. 2;

FIG. 6 is a fragmentary cross section view showing the mounting of a tilt arm and is taken along the line and in the direction indicated by the arrows 6–6 in FIG. 12;

FIG. 7 is a side elevation view of a desk clamp stand usable with the copyholder shown in FIG. 1;

FIG. 8 is an elevation view taken along the line and in the direction indicated by the arrows 8–8 in FIG. 7;

FIG. 9 is an end elevation view of a ceiling mounting stand usable with the copyholder shown in FIG. 1;

FIG. 10 is a fragmentary side elevation view taken along the line and in the direction indicated by the arrows 10–10 in FIG. 9;

FIG. 11 is a top elevation view taken along the line and in the direction indicated by the arrows 11–11 in FIG. 2;

FIG. 12 is a rear elevation view taken along the line and in the direction indicated by the arrows 12–12 in FIG. 11;

FIG. 13 is a top plan view of one form of a wall mounting bracket which can be used with the copyholder shown in FIG. 1;

FIG. 14 is a fragmentary enlarged view of the support for the swing arm taken along the line and in the direction indicated by the arrows 14–14 in FIG. 13;

FIG. 15 is a side elevation view of a slide mechanism for mounting the swing arm to a side wall;

FIG. 16 is a top plan view taken along the line and in the direction indicated by the arrows 16–16 in FIG. 15;

FIG. 17 is a fragmentary enlarged view in section of the support for the swing arm taken along the line and in the direction indicated by the arrows 17–17 in FIG. 15;

FIG. 18 is a fragmentary enlarged end elevation view in section taken along the line and in a direction indicated by the arrows 18–18 in FIG. 15;

FIG. 19 is a fragmentary enlarged side elevation view taken along the line and in the direction indicated by the arrows 19–19 in FIG. 18;

FIG. 20 is a side elevation view of another form of slide mechanism for mounting the swing arm to a side wall;

FIG. 21 is a plan view taken along the line and in the direction indicated by the arrows 21—21 in FIG. 20;

FIG. 22 is a fragmentary enlarged view in section taken along the line and in the direction indicated by the arrows 22—22 in FIG. 21;

FIG. 23 is a front elevation view of the copyholder shown in FIG. 1 but with a character measuring device attached to the top clip;

FIG. 24 is a fragmentary enlarged end elevation view in section taken along the line and in the direction indicated by the arrows 24—24 in FIG. 23;

FIG. 25 is a view like FIG. 24 but showing a modification of the device for measuring the character count;

FIG. 26 is a fragmentary enlarged view of the portion of the clip and scale shown encircled by the arrows 26—26 in FIG. 23;

FIG. 27 is a view like FIG. 26 showing a different scale;

FIG. 28 is a fragmentary front elevation view taken along the line and in the direction indicated by the arrows 28—28 in FIG. 25;

FIG. 29 is a rear elevation view of the copyholder shown in FIG. 12 as used with a portable base;

FIG. 30 is a side elevation view taken along the line and in the direction indicated by the arrows 30—30 in FIG. 29;

FIG. 31 is a fragmentary enlarged view taken along the line and in the direction indicated by the arrows 31—31 in FIG. 29;

FIG. 32 is a fragmentary view in section taken along the line and in the direction indicated by the arrows 32—32 in FIG. 2;

FIG. 33 is a view in section taken along the line and in the direction indicated by the arrows 33—33 in FIG. 2;

Figures 34, 35:
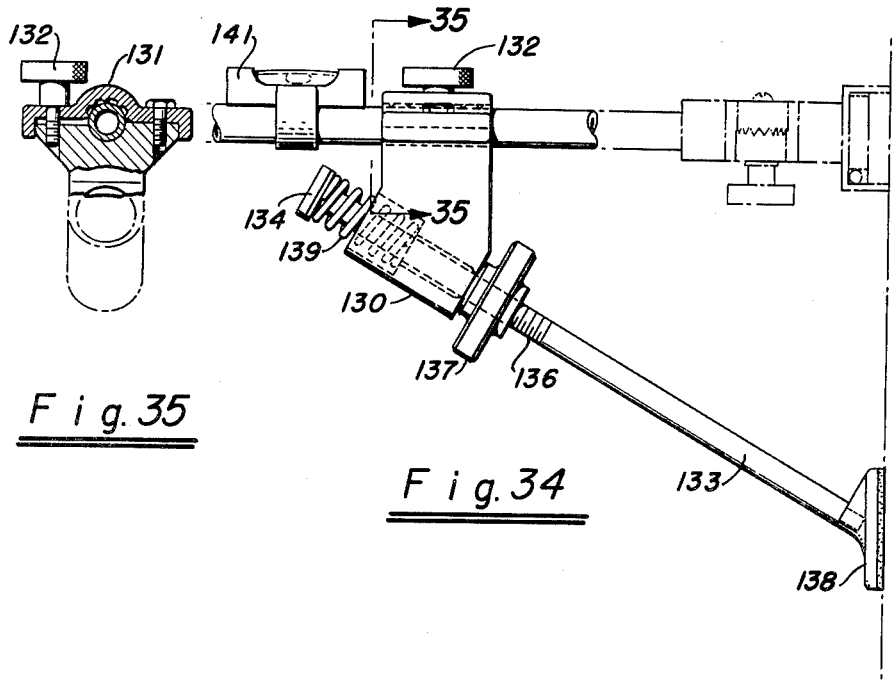
FIG. 34 is a side elevation view of a brace for giving auxiliary support to the copyholder.
FIG. 35 is a view taken along the line and in the direction indicated by the arrows 35—35 in FIG. 34.

In FIG. 1 a copyholder constructed in accordance with one embodiment of the present invention is indicated generally by the reference numeral 41. The copyholder 41 includes a board 42 providing a planar surface for supporting the material to be viewed. The copyholder 41 may also preferably include a swing arm 43. The swing arm 43 is attached to a member 44 which can be fixed directly to a wall mounted bracket 46 as viewed in FIG. 1 or which can be mounted for sliding movement along the bracket in the manner to be described below with reference to FIGS. 13 through 22. In either event, and as best shown in FIG. 14, the adjoining ends of the swing arm 43 and the member 44 are preferably formed with lugs 47 and 48, respectively, to provide a hinge joint, and the abutting surfaces of the lugs are preferably provided with serrations as illustrated which interlock when a clamping nut 49 is tightened about a bolt 51 extending vertically through the joint. Thus, the serrations interlock when the nut 49 is tightened to lock the swing arm in a fixed angular position, but act like ratchet teeth to permit easy rotation of the swing arm when the nut 49 is loosened. It will be apparent from an inspection of FIGS. 1 and 11 that the swinging movement thus afforded permits the board 42 to be quickly swung into the desired position when typing is to be done and just as quickly swung out of the way against the wall 52 when the copyholder 41 is not in use.

An end stand 45 (see also FIG. 32) may be used for auxiliary support in those instances in which heavy books or other copy are to be carried on the copyholder. Preferably the stand includes a layer of rubber or other resilient material to cushion the swing arm 43 and to eliminate any chatter due to typewriter vibration.

With particular reference now to FIGS. 5 and 6, the copyholder 41 includes a pair of tilt arms 53 which extend upwardly from the swing arm 43 to support the board 42 from the back side of the board. A channel 54 is welded or otherwise attached to the board 42 and a ring 56 is in turn suitably attached to the channel 54 for each tilt arm 53. A set screw 57 permits the board 42 to be retained at any selected position along the length of the tilt arms 53. Each tilt arm 53 is threaded into a member 58 which encircles the swing arm 43 and a set screw 59 is used to hold the tilt arm 53 in the desired axial and angular position on the swing arm 43. When dual tilt arms are used, they may be interconnected at their lower ends by a bar 50 as illustrated. Also knurled retainer knobs 55 may be threaded on the upper ends of the tilt arms.

The copyholder 41 includes a lamp 60 for lighting the material on the board 42. With reference to FIGS. 2, 3 and 5, the lamp includes a curved tubular support 61 which is vertically and rotatably adjustable within a bracket 62 suitably attached to the board 42. A set screw 63 maintains the tubular support 61 at the selected vertical position and angle. The lamp includes an elongated bulb 64, shown in dashed outline in FIG. 2, and a shade 66 which may be rotated to direct the beam of light at the angle desired.

The cord 67 for the lamp extends downwardly through the tubular support 61 and may preferably be kept out of the way as by a resilient cord clip 68 on the swing arm 53 (see FIGS. 1 and 33). The clip is attached to the swing arm by a screw 70 disposed in an opening in the back of the clip. Resilient sides of the clip spread apart to accept and then retain the cord 67 securely within the clip.

The board 42 is provided with a dull, matte surface to minimize glare, and the lower edge thereof is formed with a projecting ledge 69 to support large size books in the manner illustrated in FIG. 1. Light metals or plastics are preferably used to minimize weight.

A top clip 71 is removably attached, as by nuts 75, to the upper part of the board 42 for clamping the upper margin of material to be viewed. The clip 71 extends substantially across the entire width of the board 42 to minimize turn-up of the edges of the material to be copied and to permit two sheets of legal size paper to be held in position at one time. As will be described in greater detail with reference to FIG. 23, the clip 17 is preferably provided with a scale for measuring the character spacing of the material to be copied.

Slide clips 72 are specially curved as illustrated in FIG. 4 to accept relatively thick books. Each clip 72 is removably mounted to the board 42 by bolt and nut 73 and is rotatable about the end so attached to the board 42 to permit materials of different widths to be readily clamped in position as will be apparent from an inspection of FIG. 2.

While the swing arm 43 has been illustrated in FIG. 1 as supported by bracket 46 attached to the wall, the swing arm can just as readily be supported by a desk clamp, as illustrated in FIG. 8, or from a floor or ceiling mounted stand, as illustrated in FIGS. 9 and 10. With reference to FIGS. 7 and 8 it will be seen that the lug 47 of the swing arm 43 can be directly associated with a complementary lug 74 without any modification to the other elements of the copyholder 41. The desk clamp shown in FIGS. 7 and 8 includes a bracket 76 having an adjustable jaw 77 movable by a pair of screws 78. Locking nuts 79 are provided for locking the screws 78 in the desired position. Each of the jaws of the clamp 76 is preferably lined with cork or felt or other soft material 80 as illustrated. Two bars 81 are threaded at their lower ends into the bracket 76 and a cross bar 82 is slidably mounted thereon and lockable in a desired vertical position on the bars 81 by set screws 83. The cross bar 82 is provided with the lug 74 as above described.

In some instances it may be desired to support the copyholder 41 directly from either the floor or the ceiling, and in such instances a support like that illustrated in FIGS. 9 and 10 may be used. Thus, as illustrated in these figures, a plate 84 may be fastened to the floor or the ceiling. Depending or upstanding bars 86 threaded into the plate 84 accept a cross bar like the cross bar 82 illustrated in FIG. 8.

With reference to FIG. 11, the wall bracket 46 is provided with a pair of openings which are spaced sixteen inches apart to permit screws 87 to penetrate studs 88 of the side wall. In many cases it will be quite adequate to mount the member 44 directly to the bracket 46 as by a nut 89 in the manner illustrated in FIG. 11. In other cases it may be desired to permit some lateral adjustment of the member 44 to suit the preferences of different typists. As illustrated in FIGS. 13 and 14 bracket 46 may be provided with a longitudinally extending slot 91 for receiving a boss 92 of the member 44. One or more clamping bolts 93 and washers 94 are then provided for clamping the member 44 at any desired position along the slot 91.

In accordance with the present invention the bracket 46 may also include a slide mechanism which can be retained at any one of a series of fixed positions along the length of the slot 91. Two embodiments of this form of invention are illustrated in FIGS. 15 and 16 and FIGS. 20 and 21, respectively. In FIGS. 15 and 16 a bar 96 is mounted for sliding movement in a guide way 97 in the bracket 46 (see FIG. 17). A short tube 98 is welded or otherwise attached to the bar 96 and projects through the slot 91. The member 44 is then threaded on the projecting end of the tube 98. In the form of the invention illustrated in FIG. 16 a series of rollers 101 are disposed on the back side of the bar 96 to permit free movement of the bar in the guideway, and a rod 102 maintains vertical alignment of the bar in the guideway. The bar or slide 96 is formed with a series of recesses 103 on its upper side, and these recesses are adapted to be engaged by a spring 104 as the bar slides beneath the spring to hold the bar at any one of a series of fixed positions. It will thus be apparent that movement of the bar 96, as by pushing on a handle 106 or by pushing directly on the board 42, is effective to move the copyholder 41 out of position over the typewriter. In FIGS. 20–22 the member 44 is formed with a horizontally extending leg 107, and an additional set of rollers 108 are disposed on the front side of the bar 96 to aid in freer movement of the copyholder 41 in those applications where relatively heavy metals are used for the construction of the copyholder or a substantial amount of heavy material is expected to be carried by the copyholder.

As illustrated in FIG. 20, a spirit level 110 may be attached to the bracket 46 to aid in mounting the copyholder on the wall in a manner such that the arc of the swing arm is horizontal.

FIGS. 34 and 35 show a brace 130 for giving auxiliary support to the swing arm when heavy objects, such as large catalogs, are commonly carried as copy material on the copyholder. The brace 130 is attachable to the swing arm by a top clamping plate 131 and a cap screw 132. A rod 133 extends at an angle through the brace and includes an enlarged head piece 134, a threaded portion 136 with an adjusting nut 137, and a footpad 138 for engagement with the wall. A dampening spring 139 is seated within a counterbore in the brace and abuts the head piece 134. A level 141 permits an exact level to be obtained on adjustment of the nut 137.

In transcribing written material it is often desirable to know the character count of the lines of the material being copied and it is a convenience to be able to quickly locate the exact center of any particular line of the material being copied. The copyholder of the present invention incorporates means for accomplishing both of these results, and such means are illustrated in FIGS. 23 through 28. As illustrated in FIGS. 23, 24 and 26, scale means in the form of a transparent member 111 may be suitably attached, as by buttons 112, to the underside of the top clip 71. The member 111 is inscribed with one or more scales 113 (see FIG. 26) corresponding to standard type styles. When the appropriate scale 113 is aligned or superimposed over the characters of the material to be copied, the character count of such material can be directly read from the scale which matches the material to be copied. A standard inch scale 114 may also be inscribed on the member 111. FIG. 27 illustrates the use of a different scale 113 for measuring smaller size type than that illustrated in FIG. 26.

In FIGS. 25 and 28 there is illustrated a modification of the scale means in which a carrier or frame 116 is attached to the top clip 71 and interchangeable measuring slides 117 are insertable in the frame 116 for measuring the type style in the manner illustrated in FIG. 28.

As noted above it is often desirable to be able to determine the exact center of a line of type. Accordingly, the member 111 has an arrow 118 inscribed at the center. By moving the paper 115 beneath the arrow 118 until the line of type is disposed equidistant on both sides of the arrow 118, as can be easily determined by using either the type character scales 113 or the inch scale 114, the number of characters to the center of the line of type can be readily determined. Thus, to center the resulting line on the transcribed copy it is only necessary to adjust the typewriter to start the line a corresponding number of divisions from the center of the page being typed.

The member 111 may also preferably include arrows 119 and 121 for facilitating correct positioning of the side edges of the double or single sheets of paper to be copied.

In FIGS. 29–31 there is illustrated a portable form of the copyholder of the present invention. In this instance the copyholder 41 uses the standard board, lamp and tilt arm construction of the various forms of the invention described above with the exception that the tilt arm or tilt arms may, in the form illustrated, include horizontally extending portions for facilitating attachment to a base or stand 122. As best illustrated in FIG. 31, the stand 122 may be formed with a slot 123 at its upper end for accepting the horizontally extending portion 124 of the tilt arm 53. When the bolt 126 is tightened, the tilt arm 53 is thus retained in the angular position selected. As is apparent from the construction illustrated in FIGS. 29 through 31, the portable copyholder of the present invention may be readily knocked down and packed in a compact carrying case and thus be carried wherever desired. While not illustrated, it will be apparent that the copyholder can also be used for holding sheet music for bands and orchestras by the substitution of a light weight stand for the base 122.

Hence, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A copyholder for papers, books, and other written material comprising, a board for supporting the material to be viewed, a horizontally extending rod providing a swing arm, mounting means at one end of the swing arm mounting the swing arm for swinging motion in a horizontal plane about said one end of the arm, a tilt frame mounted on the swing arm, said tilt frame comprising a pair of tilt arm members each having a slide member encircling the swing arm rod and permitting axial movement along the length of the rod and rotation about the rod, a locking screw associated with each slide member for retaining the tilt frame in the desired axial and angular position on the swing arm, ring members attached to the back of the board for slidably receiving the upper ends of the tilt arm members therein, and locking screws associated with the ring members for retaining the board at a desired height on the tilt arm members, said slide members, ring members and locking screws forming rigid corner connections in the tilt frame.

2. A copyholder as defined in claim 1 wherein the mounting means at one end of the swing arm include a hinged joint having a pair of abutting lug surfaces formed with mating serrations, and clamping means for interlocking the serrations to hold the swing arm in a selected position in its horizontal arc of travel.

3. A copyholder for papers, books, and other written material comprising, a board for supporting the material to be viewed, a horizontally extending rod providing a swing arm, mounting means at one end of the swing arm mounting the swing arm for swinging motion in a horizontal plane about said one end of the of the arm, said mounting means including a clamp for locking the swing arm in a fixed angular position and a slide mechanism comprising a mounting bracket, a bar attached to the swing arm and slidable in a guideway formed in the bracket, a roller in the bracket engaged with the bar for facilitating alignment and free movement of the bar in the bracket, and spring means engageable with detents formed in one edge of the bar for releasably retaining the bar at any one of a series of positions along the guideway whereby the board and swing arm are movable linearly along the guideway in the mounting bracket with the swing arm in a fixed angular position, a tilt frame including slide means mounting the tilt frame on the swing arm and permitting axial movement of the tilt frame along the swing arm and rotation about the swing arm, locking means for holding the tilt frame in a fixed axial and rotative position on the swing arm, and means attaching the tilt frame to the board and permitting adjustment of the position of the board along the length of the tilt frame.

(References on following page)

References Cited by the Examiner

UNITED STATES PATENTS

| | | | |
|---|---|---|---|
| 794,099 | 7/05 | Heaney | 120—28 |
| 825,332 | 7/06 | Mack | 24—257 |
| 919,923 | 4/09 | McNatt | 120—28 |
| 1,037,140 | 8/12 | French | 120—28 X |
| 1,113,771 | 10/14 | Gardner | 120—28 |
| 1,353,279 | 9/20 | Schulthess | 120—33 |
| 1,438,268 | 12/22 | Searle | 120—28 |
| 1,658,499 | 2/28 | Stevens | 120—33 |
| 1,685,041 | 9/28 | Binkele | 120—28 |
| 1,950,706 | 3/34 | Van Alstine | 120—28 |
| 2,014,176 | 9/35 | Henderson | 120—28 X |
| 2,347,730 | 5/44 | Black | 120—33 |
| 2,469,511 | 5/49 | Murphy | 120—28 |
| 2,638,701 | 5/53 | Dahlgren | 45—82 |
| 2,722,436 | 11/55 | Pfeiffer | 282—29.2 |
| 2,864,337 | 12/58 | Reuter | 120—33 |

FOREIGN PATENTS 286,129   1/31   Italy.

EUGENE R. CAPOZIO, *Primary Examiner.*

LAWRENCE CHARLES, JEROME SCHNALL,
*Examiners.*